United States Patent Office 3,403,158
Patented Sept. 24, 1968

3,403,158
1H-PYRAZOLO[3,4-b]PYRIDINES
John H. Markillie, Cooper Township, Kalamazoo County, Mich., assignor to The Upjohn Company, Kalamazoo, Mich., a corporation of Delaware
No Drawing. Filed Mar. 11, 1966, Ser. No. 533,399
3 Claims. (Cl. 260—296)

ABSTRACT OF THE DISCLOSURE

This invention relates to novel pyrazoles and a process for their preparation. It is more particularly directed to novel 1H-pyrazolo[3,4-b]pyridines represented by the formula

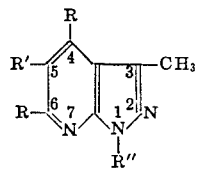

I wherein R is selected from the group consisting of lower alkyl, phenyl, lower-alkylphenyl, lower-alkoxyphenyl, and halophenyl, R' has the same meaning as R and in addition hydrogen, and R'' is lower-alkyl. The compounds of Formula I possess anti-inflammatory and oral antidiabetic activity.

---

As used in this specification, the term "lower-alkyl" means alkyl of from 1 to 4 carbon atoms, inclusive, e.g., methyl, ethyl, propyl, butyl, and isomeric forms thereof; the term "halophenyl" means halogen-substituted phenyl wherein the halogen is selected from chlorine, bromine, iodine, and fluorine; the term "lower-alkoxyphenyl" means phenyl substituted with one or more alkoxys of from 1 to 4 carbon atoms, inclusive, e.g., methoxyphenyl, trimethoxyphenyl, ethoxyphenyl, propoxyphenyl, butoxyphenyl, dibutoxyphenyl, and isomeric forms thereof; the term "lower-alkylphenyl" means phenyl substituted with one or more alkyls of from one to four carbon atoms, inclusive, e.g., tolyl, xylyl, trimethylphenyl, ethylphenyl, butylphenyl and isomeric forms thereof.

The novel 1H-pyrazolo[3,4-b]pyridines of Formula I exist either in the nonprotonated (free base) form or in the protonated (acid addition salt) form depending on the pH of the environment. They form stable protonates, i.e., acid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The novel 1H-pyrazolo[3,4-b]pyridines of Formula I are prepared by treating a 1-alkyl-3-methyl-5-aminopyrazole of the formula

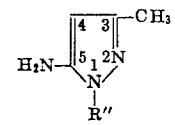

II with a corresponding diketone of the formula

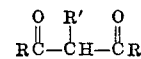

III wherein R, R' and R'' have the same meaning as above, in the presence of an acid catalyst.

1-alkyl-3-methyl-5-aminopyrazoles (II) are known in the art; they can be prepared by reacting 3-iminobutyronitrile with an alkylhydrazine.

The diketones of Formula III are well known in the art and a wide variety of them have been prepared by known methods, e.g., in accordance with Organic Syntheses 20, 32 (1940) and vol. VIII, page 133, of "Organic Reactions," John Wiley and Sons, Inc., New York, 1954. Among the known diketones that can be employed in the novel process are 1,3-diphenyl-1,3-propanedione; 1,3-di(p-tolyl)-1,3-propanedione; 1,3-di(m-chlorophenyl)-1,3-propanedione; 1,3-di(p-chlorophenyl)-1,3-propanedione; 1,3-di(p-methoxyphenyl)-1,3-propanedione; 1,3-di(p-bromophenyl)-1,3-propanedione; 2,4-pentanedione; 3-methyl-2,4-pentanedione; 3-ethyl-2,4-pentanedione; 3-butyl-2,4-pentanedione; 3-phenyl-2,4-pentanedione; 3-isopropyl-2,4-pentanedione; 3-isobutyl-2,4-pentanedione, and the like.

Suitable acid catalysts include, for example, concentrated sulfuric acid, phosphorus pentoxide, phosphorus pentachloride, polyphosphoric acid and the like, the lattermost being preferred.

In carrying out the reaction between the 1-alkyl-3-methyl-5-aminopyrazole (II) and the diketone of Formula III, the two reactants are mixed with the acid catalyst and the mixture is heated, e.g., between about 50° C. and about 175° C., preferably between about 100° C. and about 150° C. Inert solvents are not necessary but can be employed, if desired. The molecular ratio of the compounds of Formula II and Formula III can be varied, molar ratios of about 1:1 to about 1:2 having been found satisfactory. The time required for the completion of the reaction depends upon such factors as the reaction temperature, the particular reactants employed, the relative amounts of reactants, thoroughness of mixing, and the like. Therefore, it will be understood that the optimum reaction time will vary for each set of reaction conditions. Ordinarily, reaction times ranging from about 10 minutes to about 1 hour are suitable. After completion of the reaction, the reaction mixture is diluted with water and neutralized with a base (e.g., ammonium hydroxide) and the thus-produced 1H-pyrazolo[3,4-b]pyridine of Formula I isolated from the reaction mixture in its free base form, using conventional procedures such as solvent evaporation, solvent extraction, chromatography or crystallization, or a combination of these methods. Each of the free bases so obtained can be purified, e.g., by recrystallization from a suitable solvent or pair of solvents. The free base can be converted to any desired acid addition salt by neutralization with an acid, e.g., any of those given above. In those cases where the free bases of the compounds of Formula I are not readily obtained in the crystalline state (e.g., as in Example 1, below) they can be converted to crystalline acid addition salts, for example, by dissolving the residues containing the bases in ether and treating with ether solutions of acids, e.g., hydrogen chloride, hydrogen bromide, sulfuric acid, phosphoric acid, acetic acid, succinic acid, malic acid, cyclohexanesulfamic acid, etc., to give the corresponding acid addition salt of the 1H-pyrazolo[3,4-b]pyridine.

The novel compounds of Formula I, in their free base form and in the form of their acid addition salts with pharmacologically acceptable acids, for example, hydrochloric, hydrobromic, sulfuric, phosphoric, nitric, acetic, benzoic, salicylic, glycolic, succinic, nicotinic, tartaric, maleic, malic, lactic, methanesulfonic, and cyclohexanesulfamic acids, and the like, exhibit pharmacological activity. The compounds of Formula I possess anti-inflammatory and oral anti-diabetic activity; they can be used in the treatment of inflammatory conditions of the skin, eyes and respiratory tract and diabetes in mammals and animals, e.g., mice, rats, dogs and birds.

The following preparation and examples are illustrative of the process and products of the present invention, but are not to be construed as limiting.

PREPARATION 1

*1,3-dimethyl-5-aminopyrazole (II)*

A solution of 12 g. (0.26 mole) of methylhydrazine and 16.4 g. (0.2 mole) of 3-iminobutyronitrile in 50 ml. of absolute ethanol was heated on a steam bath for 4.5 hours. The reaction mixture was concentrated under vacuum and the residue was crystallized from benzene and then from water to give 6.2 g. (56% yield) of product, 1,3-dimethyl-5-aminopyrazole (II) melting at 77.5 to 78.5° C.

*Analysis.*—Calcd. for $C_5H_9N_3$: C, 54.03; H, 8.16; N, 37.81. Found: C, 54.35; H, 8.02; N, 37.68.

Following procedures similar to that of Preparation 1 but substituting for methylhydrazine the following:

ethylhydrazine,
propylhydrazine,
isopropylhydrazine, and
butylhydrazine, yields, respectively:

1-ethyl-3-methyl-5-aminopyrazole.
1-propyl-3-methyl-5-aminopyrazole,
1-isopropyl-3-methyl-5-aminopyrazole, and
1-butyl-3-methyl-5-aminopyrazole.

EXAMPLE 1

*1,3,4,6-tetramethyl-1H-pyrazolo[3,4-b]pyridine hydrochloride (I)*

A mixture of 11.1 g. (0.1 mole) of 1,3-dimethyl-5-amino-pyrazole (II) and 20 ml. (0.2 mole) of acetylacetone (alternatively named 2,4-pentanedione) (III) in about 20 ml. of polyphosphoric acid was warmed to 50° C., at which point the temperature of the reaction mixture rose rapidly to 130° C. The reaction mixture was heated at 140 to 150° C. for ½ hour and cooled to room temperature. Then 200 ml. of water and concentrated ammonium hydroxide were added until the reaction mixture was neutral. It was extracted three times with benzene; the combined extract was dried and concentrated in vacuo. The dark oily residue was dissolved in ether and ethereal hydrogen chloride was added. The resulting solid material was collected and recrystallized twice from 95% ethanol to give 6 g. (28% yield) of product, 1,3,4,6-tetramethyl-1H - pyrazolo[3,4 - b]pyridine hydrochloride (I), which melted (with decomposition) at 246° C.

*Analysis.*—Calcd. for $C_{10}H_{13}N_3 \cdot HCl$: C, 56.73; H, 6.67; Cl, 16.75; N, 19.85. Found: C, 56.82; H, 6.98; Cl, 16.15; N, 20.08.

Infrared and NMR spectra support the structure.

On neutralization of the hydrochloride with sodium or potassium hydroxide, the free base form, 1,3,4,6-tetramethyl-1H-pyrazolo[3,4-b]pyridine, is obtained.

Following the procedure of Example 1, but substituting for hydrochloric acid another acid, e.g., hydrobromic, sulfuric, phosphoric, acetic, benzoic, salicylic, citric, succinic, malic, cyclohexanesulfamic, etc., gives the corresponding acid addition salt of 1,3,4,6-tetramethyl-1H-pyrazola[3,4-b]pyridine.

Following the procedure of Example 1, but substituting for 1,3-dimethyl-5-aminopyrazole the following:

1-ethyl-3-methyl-5-aminopyrazole,
1-propyl-3-methyl-5-aminopyrazole,
1-isopropyl-3-methyl-5-aminopyrazole, and
1-butyl-3-methyl-5-aminopyrazole, yields, respectively:

1-ethyl-3,4,6-trimethyl-1H-pyrazolo[3,4-b]
 pyridine hydrochloride,
1-propyl-3,4,6-trimethyl-1H-pyrazolo[3,4-b]
 pyridine hydrochloride,
1-isopropyl-3,4,6-trimethyl-1H-pyrazolo[3,4-b]
 pyridine hydrochloride, and
1-butyl-3,4,6-trimethyl-1H-pyrazolo[3,4-b]
 pyridine hydrochloride.

The thus-produced compounds of the immediately preceding paragraph are converted to their free base forms by neutralization with sodium or potassium hydroxide.

EXAMPLE 2

*1,3-dimethyl-4,6-diphenyl-1H-pyrazolo[3,4-b] pyridine (I)*

A mixture of 11.1 g. (0.1 mole) of 1,3-dimethyl-5-aminopyrazole (II) and 22.5 g. of 1,3-diphenyl-1,3-propanedione (III) in about 20 ml. of polyphosphoric acid was heated to 70° C. at which point the temperature rose rapidly to 100° C. The temperature was then raised to 140° C. when it rapidly rose to 160° C. The reaction mixture was heated at this temperature for ½ hour, then cooled; water and concentrated ammonium hydroxide were then added until the reaction mixture was neutral. The mixture was extracted with ether. The organic layer was dried and concentrated in vacuo. The residue was recrystallized twice from isopropanol to give 26 g. (87% yield) of product, 1,3-dimethyl-4,6-diphenyl-1H-pyrazolo [3,4-b]pyridine (I), which melted at 98 to 99° C.

*Analysis.*—Calcd. for $C_{20}H_{17}N_3$: C, 80.24; H, 5.72; N, 14.04. Found: C, 80.03; H, 5.92; N, 14.05.

Infrared and NMR spectra support the structure.

The addition of a diethyl ether solution of hydrogen chloride, hydrogen bromide, sulfuric acid, phosphoric acid, acetic acid, benzoic acid, salicylic acid, citric acid, succinic acid, malic acid, cyclohexanesulfamic acid, etc. to an ethanol solution of 1,3-dimethyl-4,6-diphenyl-1H-pyrazolo[3,4-b]pyridine, followed by evaporation to dryness, gives the corresponding acid addition salt.

Following the procedure of Example 2, but substituting for 1,3-dimethyl-5-aminopyrazole the following:

1-ethyl-3-methyl-5-aminopyrazole,
1-propyl-3-methyl-5-aminopyrazole,
1-isopropyl-3-methyl-5-aminopyrazole, and
1-butyl-3-methyl-5-aminopyrazole, yields, respectively:

1-ethyl-3-methyl-4,6-diphenyl-1H-pyrazolo
 [3,4-b]pyridine,
1-propyl-3-methyl-4,6-diphenyl-1H-pyrazolo
 [3,4-b]pyridine,
1-isopropyl-3-methyl-4,6-diphenyl-1H-pyrazolo
 [3,4-b]pyridine, and
1-butyl-3-methyl-4,6-diphenyl-1H-pyrazolo
 [3,4-b]pyridine.

Following procedures similar to those of Examples 1 and 2, the paragraphs thereafter and the general methods for preparing the compounds of Formula I described above, but employing the following diketones:

(1) 3-methyl-2,5-pentanedione,
(2) 3-ethyl-2,4-pentanedione,
(3) 3-butyl-2,4-pentanedione, (4) 3-isopropyl-2,4-pentanedione,
(5) 3-isobutyl-2,4-pentanedione,
(6) 1,3-di(p-tolyl)-1,3-propanedione,
(7) 1,3-di(m-chlorophenyl)-1,3-propanedione,
(8) 1,3-di(p-chlorophenyl)-1,3-propanedione,
(9) 1,3-di(p-bromophenyl)-1,3-propanedione,
(10) 1,3-di(p-methoxyphenyl)-1,3-propanedione,
(11) 3,5-heptanedione,
(12) 4,6-nonanedione,
(13) 2,6-dimethyl-3,5-heptanedione,
(14) 5,7-undecanedione,
(15) 2,8-dimethyl-4,6-nonanedione,
(16) 2,2,6,6-tetramethyl-3,5-heptanedione,
(17) 4-methyl-3,5-heptanedione,
(18) 5-ethyl-4,6-nonanedione,
(19) 2-ethyl-1,3-diphenyl-1,3-propanedione,
(20) 1,2,3-triphenyl-1,3-propanedione,
(21) 1,3-diphenyl-2-(p-tolyl)-1,3-propanedione,
(22) 1,3-di(p-fluorophenyl)-1,3-propanedione,
(23) 1,3-di(p-iodophenyl)-1,3-propanedione,
(24) 1,3-dimesityl-1,3-propanedione,
(25) 1,3-di(2,4-dimethoxyphenyl)-1,3-propanedione, and
(26) 1,3-di(2,4,6-trichlorophenyl)-1,3-propanedione, yields, respectively:

(1) 1,3,4,5,6-pentamethyl-1H-pyrazolo[3,4-b]pyridine,
(2) 1,3,4,6-tetramethyl-5-ethyl-1H-pyrazolo[3,4-b]pyridine,
(3) 1,3,4,6-tetramethyl-5-butyl-1H-pyrazolo[3,4-b]pyridine,
(4) 1,3,4,6-tetramethyl-5-isopropyl-1H-pyrazolo[3,4-b]pyridine,
(5) 1,3,4,6-tetramethyl-5-isobutyl-1H-pyrazolo[3,4-b]pyridine,
(6) 1,3-dimethyl-4,6-di(p-tolyl)-1H-pyrazolo[3,4-b]pyridine,
(7) 1,3-dimethyl-4,6-di(m-chlorophenyl)-1H-pyrazolo[3,4-b]pyridine,
(8) 1,3-dimethyl-4,6-di(p-chlorophenyl)-1H-pyrazolo[3,4-b]pyridine,
(9) 1,3-dimethyl-4,6-di(p-bromophenyl)-1H-pyrazolo[3,4-b]pyridine,
(10) 1,3-dimethyl-4,6-di(p-methoxyphenyl)-1H-pyrazolo[3,4-b]pyridine,
(11) 1,3-dimethyl-4,6-diethyl-1H-pyrazolo[3,4-b]pyridine,
(12) 1,3-dimethyl-4,6-dipropyl-1H-pyrazolo[3,4-b]pyridine,
(13) 1,3-dimethyl-4,6-diisopropyl-1H-pyrazolo[3,4-b]pyridine,
(14) 1,3-dimethyl-4,6-dibutyl-1H-pyrazolo[3,4-b]pyridine,
(15) 1,3-dimethyl-4,6-diisobutyl-1H-pyrazolo[3,4-b]pyridine,
(16) 1,3-dimethyl-4,6-di-t-butyl-1H-pyrazolo[3,4-b]pyridine,
(17) 1,3,5-trimethyl-4,6-diethyl-1H-pyrazolo[3,4-b]pyridine,
(18) 1,3-dimethyl-5-ethyl-4,6-dipropyl-1H-pyrazolo[3,4-b]pyridine,
(19) 1,3-dimethyl-5-ethyl-4,6-diphenyl-1H-pyrazolo[3,4-b]pyridine,
(20) 1,3-dimethyl-4,5,6-triphenyl-1H-pyrazolo[3,4-b]pyridine,
(21) 1,3-dimethyl-5-(p-tolyl)-4,6-diphenyl-1H-pyrazolo[3,4-b]pyridine,
(22) 1,3-dimethyl-4,6-di(p-fluorophenyl)-1H-pyrazolo[3,4-b]pyridine,
(23) 1,3-dimethyl-4,6-di(p-iodophenyl)-1H-pyrazolo[3,4-b]pyridine,
(24) 1,3-dimethyl-4,6-dimesityl-1H-pyrazolo[3,4-b]pyridine,
(25) 1,3-dimethyl-4,6-di(2,4-dimethoxyphenyl)-1H-pyrazolo[3,4-b]pyridine and
(26) 1,3-dimethyl-4,6-di(2,4,6-trichlorophenyl)-1H-pyrazolo[3,4-b]pyridine, the acid addition salts thereof, and the corresponding compounds wherein the 1-substituent is an alkyl other than methyl, e.g., ethyl, propyl, isopropyl, butyl, etc.

I claim:
1. A compound selected from the group consisting of (1) a compound of the formula

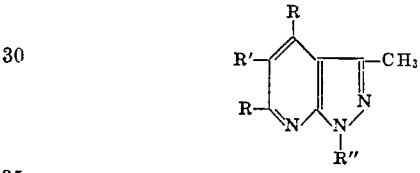

wherein R is selected from the group consisting of lower-alkyl, phenyl, lower-alkylphenyl, lower-akoxyphenyl and halophenyl, R' has the same meaning as R and in addition hydrogen, R" is lower-alkyl, and (2) an acid addition salt thereof.

2. An acid addition salt of a compound of claim 1 wherein R is methyl, R' is hydrogen, R" is methyl and the acid addition salt is that of hydrochloric acid, namely, 1,3,4,6 - tetramethyl-1H-pyrazolo[3,4-b]pyridine hydrochloride.

3. A compound of claim 1 wherein R is phenyl, R' is hydrogen and R" is methyl, namely, 1,3-dimethyl-4,6-diphenyl-1H-pyrazolo[3,4-b]pyridine.

References Cited

UNITED STATES PATENTS 3,250,769   5/1966   Schmidt et al. _____ 260—296

HENRY R. JILES, *Primary Examiner.*

A. L. ROTMAN, *Assistant Examiner.*